(12) United States Patent
Blain et al.

(10) Patent No.: US 10,055,104 B2
(45) Date of Patent: *Aug. 21, 2018

(54) TOOLBAR DOCUMENT CONTENT SHARING

(71) Applicant: Google Inc., Mountain View, CA (US)

(72) Inventors: Matthew E. Blain, Sunnyvale, CA (US); Alexander M. Mendes Da Costa, San Francisco, CA (US); Na A. Tang, San Jose, CA (US)

(73) Assignee: Google LLC, Mountain View, CA (US)

( * ) Notice: Subject to any disclaimer, the term of this patent is extended or adjusted under 35 U.S.C. 154(b) by 859 days.

This patent is subject to a terminal disclaimer.

(21) Appl. No.: 14/266,166

(22) Filed: Apr. 30, 2014

(65) Prior Publication Data

US 2014/0237396 A1 Aug. 21, 2014

Related U.S. Application Data

(63) Continuation of application No. 11/321,077, filed on Dec. 30, 2005, now Pat. No. 8,732,614.

(51) Int. Cl.
*G06F 3/048* (2013.01)
*G06F 3/0484* (2013.01)
*G06F 3/0482* (2013.01)

(52) U.S. Cl.
CPC ........ *G06F 3/04842* (2013.01); *G06F 3/0482* (2013.01)

(58) Field of Classification Search
CPC .................. G06F 3/044842; G06F 3/0482
See application file for complete search history.

(56) References Cited

U.S. PATENT DOCUMENTS

| 5,550,969 A | 8/1996 | Torres et al. |
| 6,708,205 B2 * | 3/2004 | Sheldon .................. H04L 51/12 709/206 |
| 7,278,092 B2 | 10/2007 | Krzanowski |
| 7,802,207 B2 | 9/2010 | Agboatwalla et al. |
| 8,020,101 B2 * | 9/2011 | Kesavarapu ............ G06F 9/543 715/724 |
| 2005/0039141 A1 | 2/2005 | Burke et al. |
| 2005/0198220 A1 * | 9/2005 | Wada ................ G06F 17/30899 709/220 |
| 2005/0204309 A1 * | 9/2005 | Szeto .................. H04L 12/5845 715/811 |

(Continued)

OTHER PUBLICATIONS

Bill Camarda; Special Edition Using® Microsoft® Office Word 2003; Dec. 12, 2003; Que; ISBN-10:0/7897-2958-3; Pages in print edition 1272.

(Continued)

*Primary Examiner* — Anil N Kumar
(74) *Attorney, Agent, or Firm* — McDermott Will & Emery LLP

(57) ABSTRACT

A system may provide a toolbar in a browser at a client, where the toolbar permits user selection from multiple different services for sharing document content. The system may receive a selection of a first one of the multiple different services from a user via the toolbar and may receive a selection of content of a first document browsed by the user. The system may post the selected content in a second document associated with the first one of the multiple different services.

20 Claims, 15 Drawing Sheets

(56) References Cited

U.S. PATENT DOCUMENTS

| | | | |
|---|---|---|---|
| 2005/0246651 A1* | 11/2005 | Krzanowski | H04L 67/02 |
| | | | 715/770 |
| 2006/0010394 A1 | 1/2006 | Chaudhri et al. | |
| 2006/0010395 A1* | 1/2006 | Aaltonen | G06F 3/0482 |
| | | | 715/779 |
| 2007/0157104 A1 | 7/2007 | Blain et al. | |
| 2007/0192725 A1 | 8/2007 | Chen et al. | |

OTHER PUBLICATIONS

"Yahoo! Toolbar —Anti-Spy"; http://messages.toolbar.yahoo.com/toolbar/threadview?m=tm&bn=TOO-YTIE&tid=582&mid=582&tof=-1&rt=2&frt=2&off=1, Jun. 19, 2008, 1 page.

"Sharing Information Using Yahoo! Smart Tools"; http://help.yahoo.com/l/us/yahoo/toolbar/features/smarttools/smarttools-08.html, Jun. 19, 2008, 1 page.

"Yahoo Launches My Web Personal Search"; http://searchenginewatch.com/showPage.html?page=3500716, Jun. 19, 2008, 1 page.

"Sharing Information Using Yahoo! Smart Tools" http://usatoday.com/tech/news/techpolicy/2005-06-22-file-sharing_x.htm, Jun. 19, 2008, 1 page.

"Saving, Sharing, and Syndicating Search via My Web"; http://www.ysearchblog.com/archives/000104.html, Jun. 19, 2008, 8 pages.

"My Web 2.0 Beta"; http://myweb.search.yahoo.com/myresults/faq, Jun. 19, 2008, 11 pages.

"Seizing on Copyright-Friendly, file-swapping alternatives" http://www.usatoday.com/tech/news/techpolicy/2005-06-22-file-sharing_x.htm, Jun. 19, 2008, 3 pages.

Walter Glenn, "Word 2000 in a Nutshell", Aug. 18, 2000, 2 pages.

\* cited by examiner

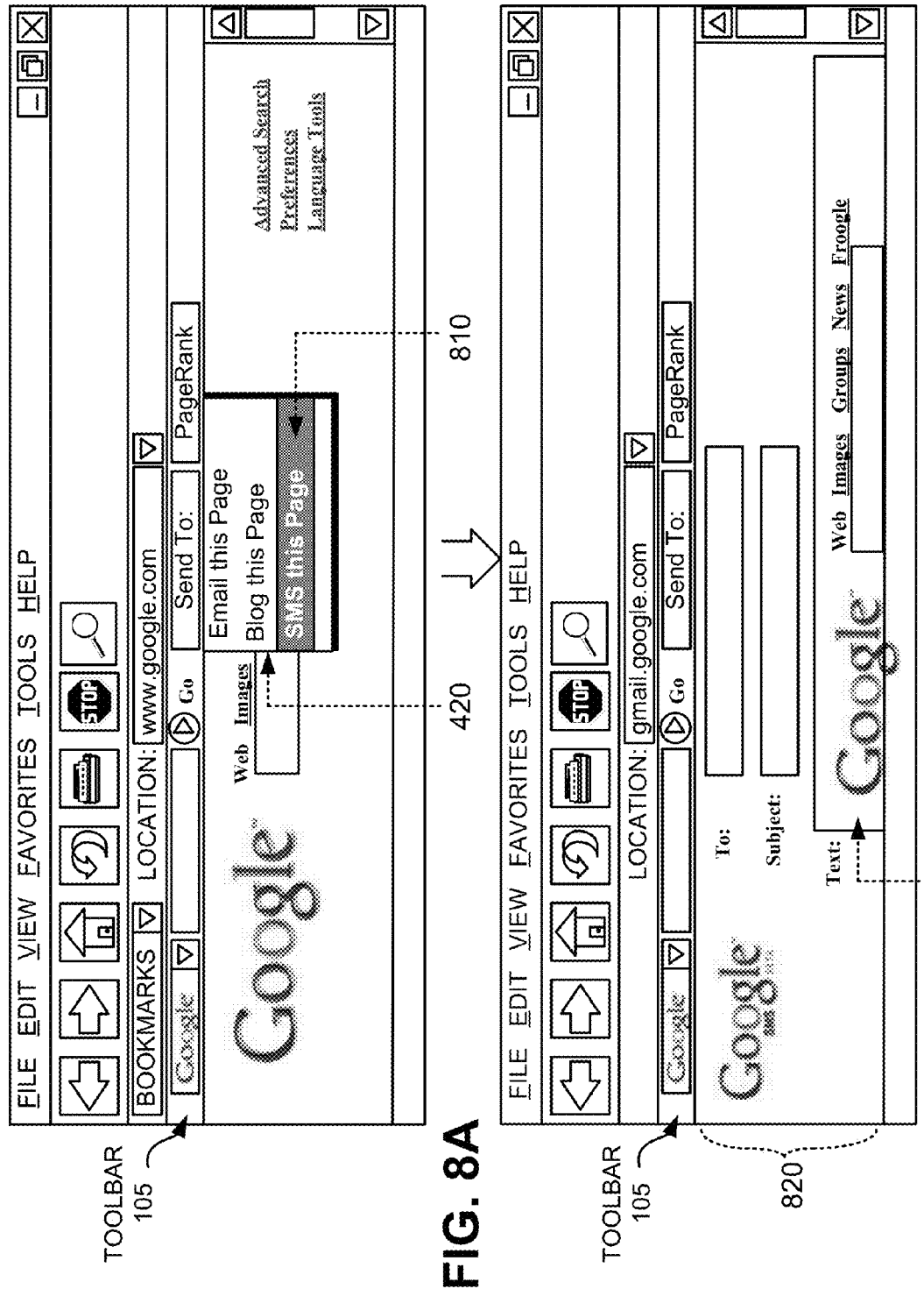

TOOLBAR DOCUMENT CONTENT SHARING

RELATED APPLICATION

This application is a continuation of U.S. patent application Ser. No. 11/321,077, filed Dec. 30, 2005, the disclosure of which is incorporated herein by reference.

BACKGROUND

Field of the Invention

Implementations described herein relate generally to document browsing and, more particularly, to sharing document content via a browser toolbar.

Description of Related Art

The advent of the global Internet and the World Wide Web ("web") has given users throughout the world the capability to quickly and easily access and retrieve information stored at remote locations. Through the web, users may access, via laptop or desktop computers at their home or business (or via other types of devices such as PDAs, public Internet terminals, etc.), documents stored anywhere in the world. When accessing documents via the web, users may desire to share content contained in the accessed documents with other users. To share the content, a user may, for example, copy a portion of a document being browsed, manually open an e-mail client, manually open a new e-mail message, and then manually paste the portion of the document within the e-mail message. Sharing document content in such a manner, however, may be undesirably cumbersome and time consuming.

SUMMARY

According to one aspect, a method may include providing a menu listing multiple different services to a user for sharing content with other users and receiving a selection of one of the multiple different services from the menu. The method may further include providing user selected content to the one of the multiple different services.

According to another aspect, a method may include providing a toolbar in a browser at a client, where the toolbar permits user selection from a group of different services for sharing document content. The method may further include receiving a selection of a first one of the group of different services from a user via the toolbar and receiving a selection of content of a first document browsed by the user. The method may also include posting the selected content in a second document associated with the first one of the group of different services.

According to a further aspect, a graphical user interface implemented at a computer may include a first graphical area on a toolbar of the graphical user interface and a second graphical area activated by selection of the first graphical area. The second graphical area may list multiple services that can be selected by a user for sharing document content and the multiple services may include an e-mail service, a blog service and a short message service (SMS).

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIGS. 8A and 8B are diagrams of the selection of a short message service (SMS) from multiple services provided on a browser toolbar for sharing document with other users.

DETAILED DESCRIPTION

The following detailed description of the invention refers to the accompanying drawings. The same reference numbers in different drawings may identify the same or similar elements. Also, the following detailed description does not limit the invention.

Consistent with aspects of the invention, a browser toolbar may be enhanced with document content sharing functionality that permits a user to automatically share user selected document content with one or more other users using multiple messaging services. The toolbar may include a menu that permits a user to select from the multiple messaging services that can be used to share document content with the other users. The multiple messaging services may include, for example, an email service (e.g., Google Gmail), a blog service (e.g., Google Blogger) or a short message service (e.g., Google SMS). After selection of one of the multiple messaging services from the toolbar menu, the toolbar may automatically cause the selected content to be posted in a document associated with the one of the multiple messaging services. The selected message service may subsequently forward the selected content to its intended destination to share the content with other users.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

OVERVIEW

Figure 1:
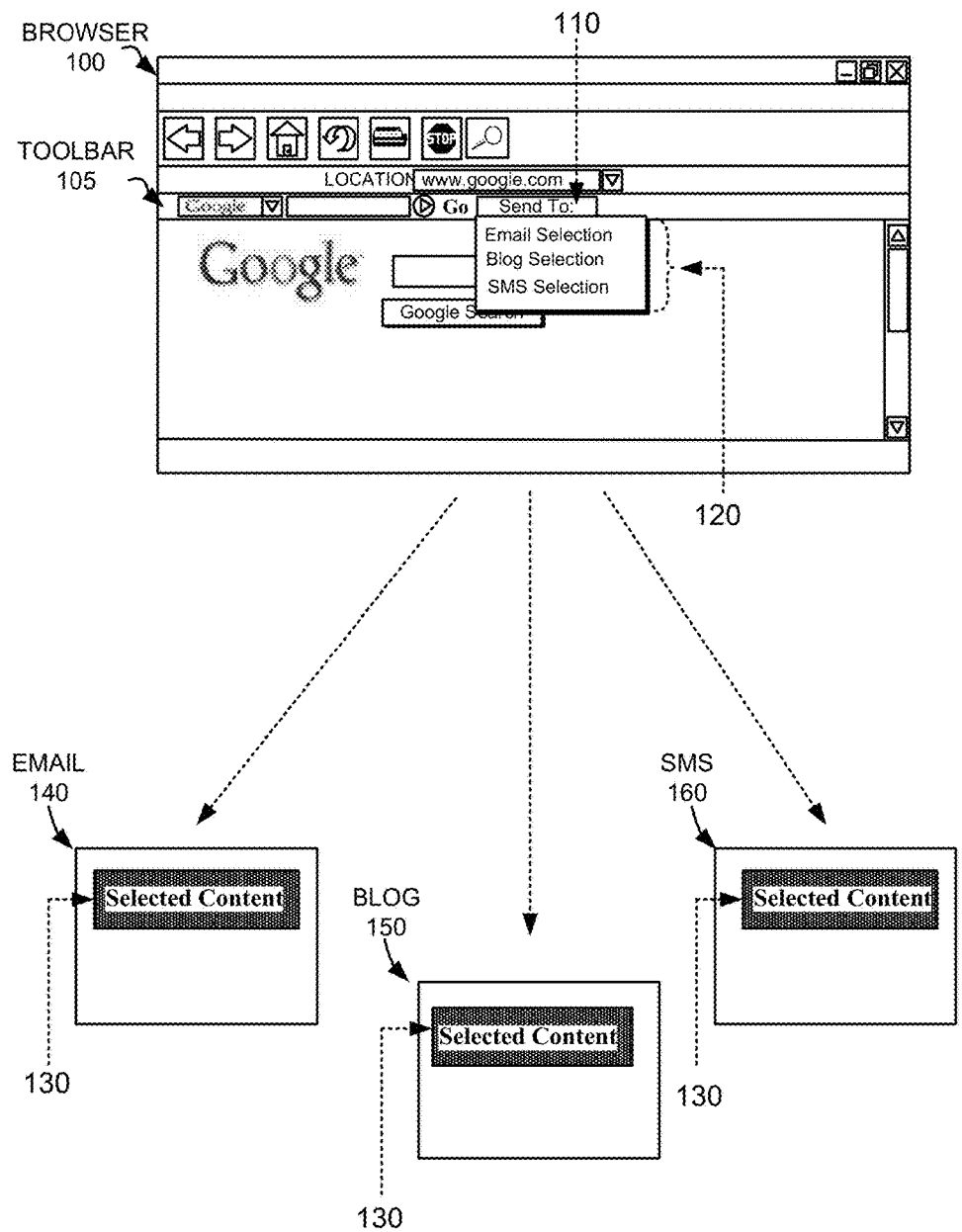
FIG. 1 is an exemplary diagram of an overview of an implementation of the invention.

FIG. 1 illustrates an exemplary overview of a browser toolbar that permits a user browsing documents to copy all, or portions, of the content of the documents and selectively provide the content to other users via a messaging service, such as, for example, an e-mail service, a blog service, or a short message service (SMS). As shown in FIG. 1, a user browsing documents via a browser 100 may select a button 110 from a toolbar 105 displayed on browser 100. Selection of button 110 may result in the display of a menu 120 that includes multiple different content delivery service options. For example, menu 120 may include an "Email selection" option, a "Blog selection" option, and/or a "SMS selection" option. While e-mail, blog, and SMS delivery service options are discussed below, it will be appreciated that other content delivery options may alternatively be provided. For example, an "Instant Messaging selection" option may also, or alternatively, be presented to the user.

User selection of one of the options from menu 120 results in toolbar 105 opening another browser (not shown) and directing the newly opened browser to one of an e-mail document 140, a blog document 150, or an SMS message document 160 hosted by a corresponding e-mail, blog, or SMS service. Toolbar 105 may automatically post user selected content 130 (e.g., selected content of a document, or an entire document) in one of e-mail document 140, blog document 150, or SMS message document. In other implementations, the email document 140, blog document 150 of SMS message document 160 may be opened in a browser sidebar (not shown), instead of a new browser.

Subsequent to posting of the user selected content, the corresponding e-mail, blog or SMS services may transmit messages containing the user selected content to their appropriate destinations. For example, if a user uses toolbar 105 to post content in an e-mail, the corresponding e-mail service may forward the e-mail to the destination e-mail address(es) specified by the user. As another example, if the user uses toolbar 105 to post content in a blog, the corresponding blogging service may post the content on a web document that may be accessed by other users (i.e., bloggers). As a further example, if the user uses toolbar 105 to post content in a SMS message, the corresponding SMS service may forward the message to the appropriate wireless device (e.g., cellular telephone) specified by the user.

EXEMPLARY NETWORK CONFIGURATION

Figure 2:
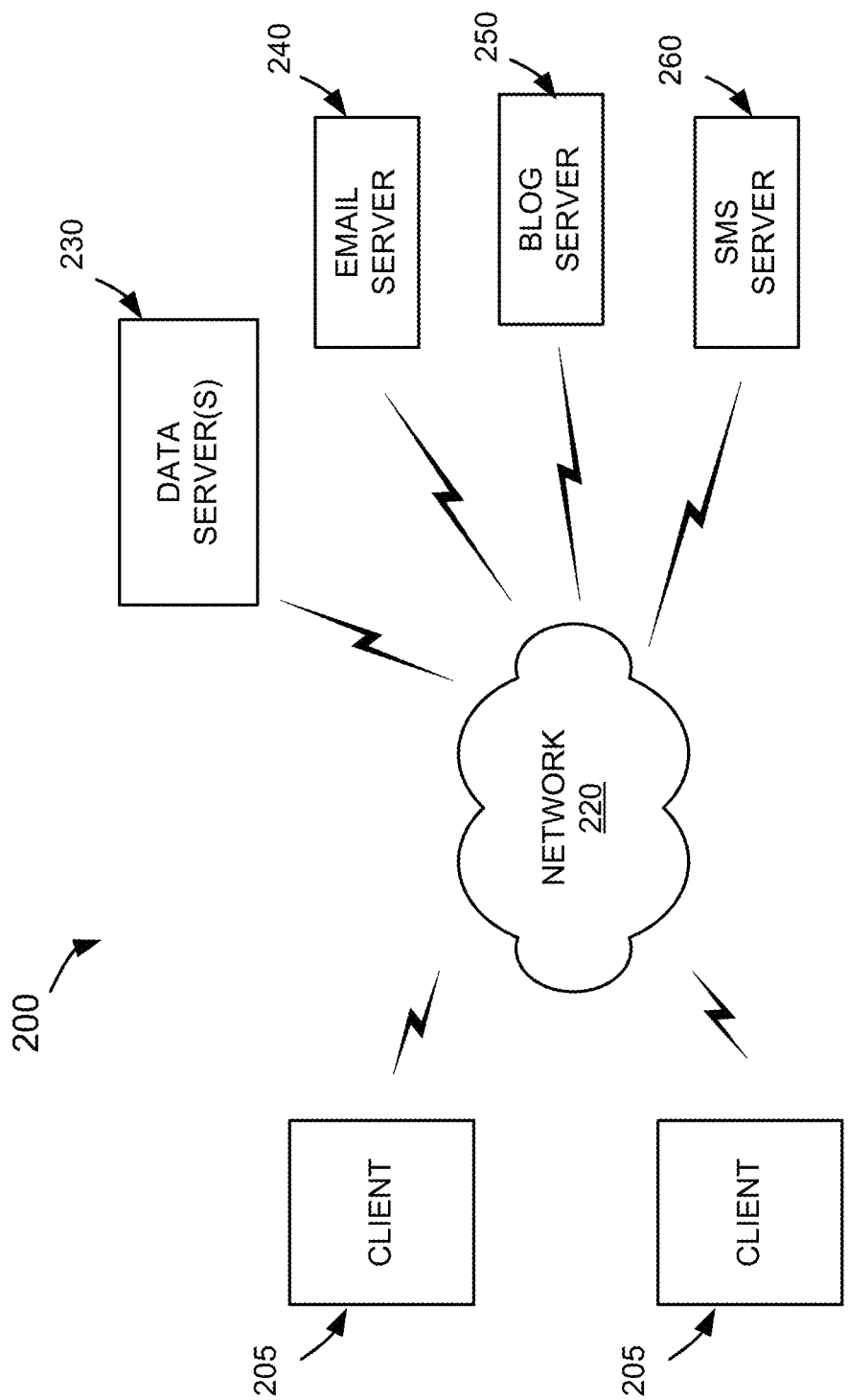
FIG. 2 is an exemplary diagram of a network in which systems and methods consistent with principles of the invention may be implemented.

FIG. 2 is an exemplary diagram of a network 200 in which systems and methods consistent with the principles of the invention may be implemented. Network 200 may include multiple clients 205 connected to server 230, email server 240, blog server 250 and short message service (SMS) server 260 via a network 220. Two clients 205 and servers 230, 240, 250 and 260 have been illustrated as connected to network 220 for simplicity. In practice, there may be more or fewer clients and servers. Also, in some instances, a client may perform one or more functions of a server and a server may perform one or more functions of a client.

Clients 205 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Clients 205 may implement a browser for browsing documents stored at server 230, the browser including a toolbar 105 that includes document content sharing functionality, as further described in detail below. Clients 205 and servers 230, 240, 250 and 260 may connect to network 220 via wired, wireless, and/or optical connections.

Data server(s) 230 may store or maintain documents that may be browsed by clients 205. Such documents may include data related to published news stories, products, images, user groups, geographic areas, or any other type of data. For example, server(s) 230 may store or maintain news stories from any type of news source, such as, for example, the Washington Post, the New York Times, Time magazine, or Newsweek. As another example, server(s) 230 may store or maintain data related to specific products, such as product data provided by one or more product manufacturers. As yet another example, server(s) 230 may store or maintain data related to other types of web documents, such as pages of web sites.

Email server 240 may provide an electronic mail service (e.g., Google Gmail) that permits users at clients 205 to send email to other users via email server 240. Blog Server 250 may host content posted by users from clients 205. Short message service (SMS) server 260 may transfer messages (e.g., text messages) from users at clients 205 to mobile devices, such as, for example, cellular telephones via SMS.

While servers 230, 240, 250 and 260 are shown as separate entities, it may be possible for one of servers 230-260 to perform one or more of the functions of the other one of servers 230-260. For example, it may be possible that multiple ones of servers 230-260 are implemented as a single server. It may also be possible for a single one of servers 230-260 to be implemented as two or more separate (and possibly distributed) devices.

Network 220 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

EXEMPLARY CLIENT/SERVER ARCHITECTURE

Figure 3:
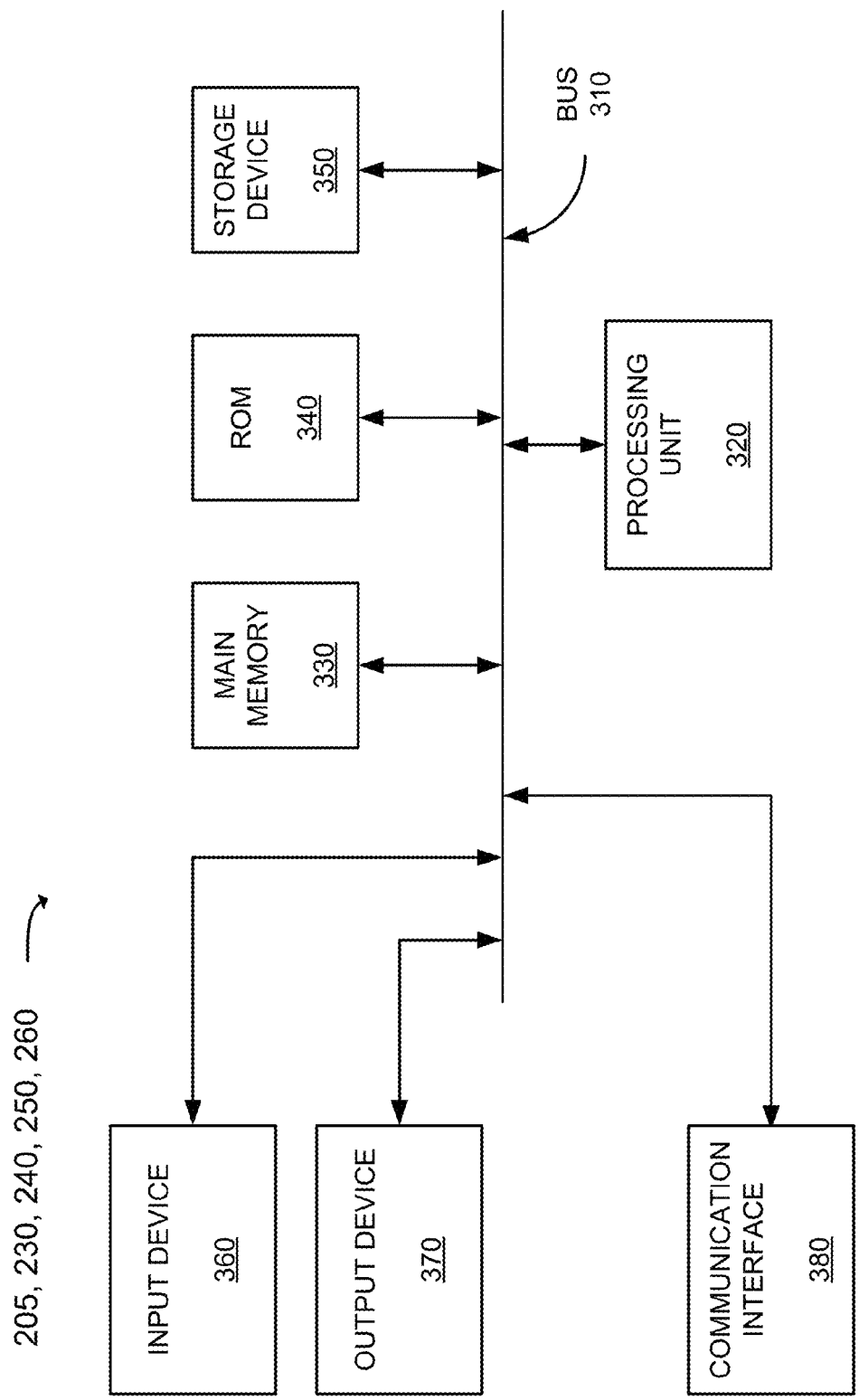
FIG. 3 is an exemplary diagram of a client or server of FIG. 2 according to an implementation consistent with principles of the invention.

FIG. 3 is an exemplary diagram of a client or server entity (hereinafter called "client/server entity"), which may correspond to one or more of clients 205 and/or servers 230-260, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 220.

The client/server entity, consistent with the principles of the invention, may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

EXEMPLARY CLIENT TOOLBAR

Figure 4A:
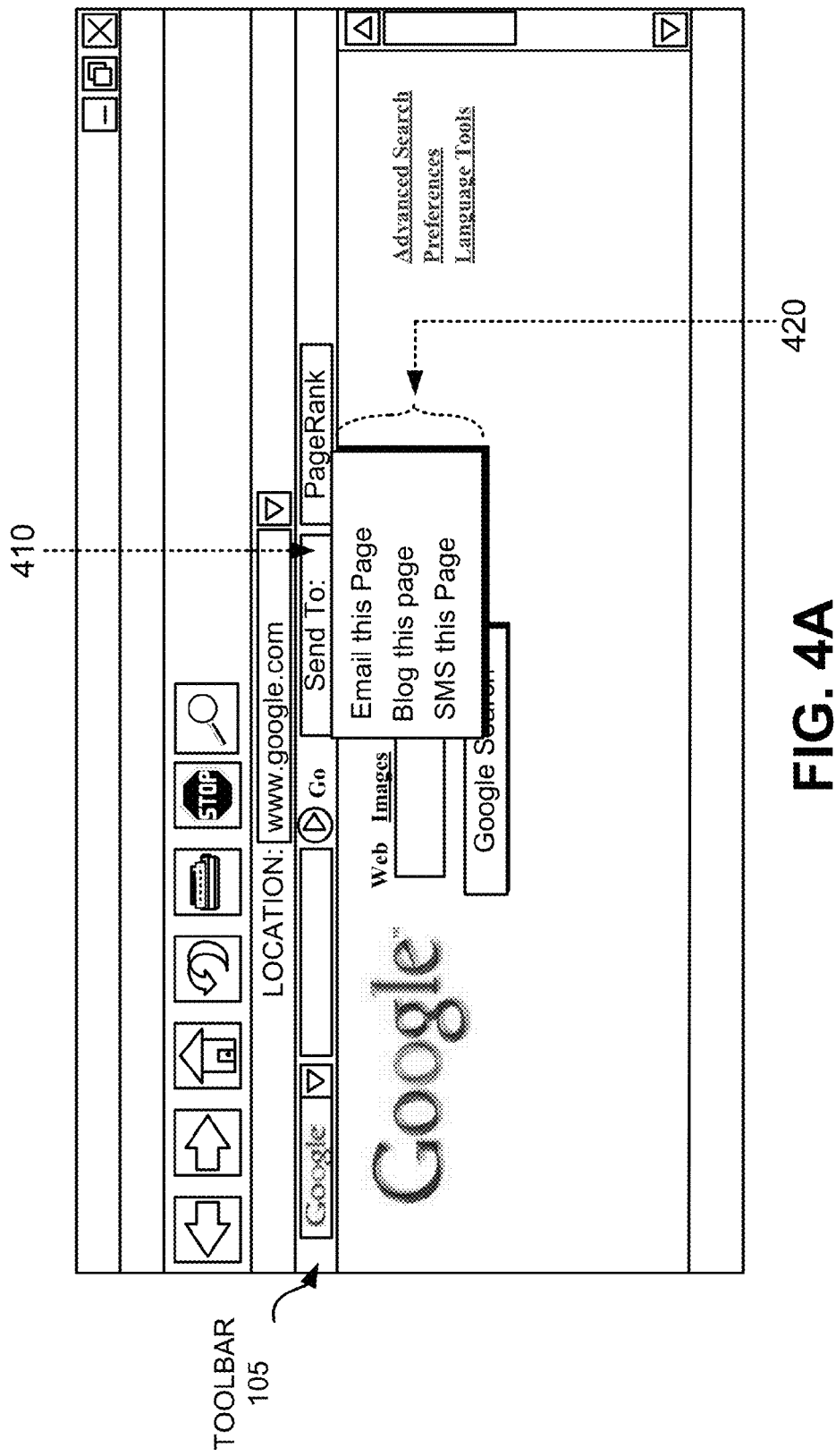
FIGS. 4A and 4B are diagrams of an exemplary button and menu of a browser toolbar consistent with principles of the invention.
Figure 4B:
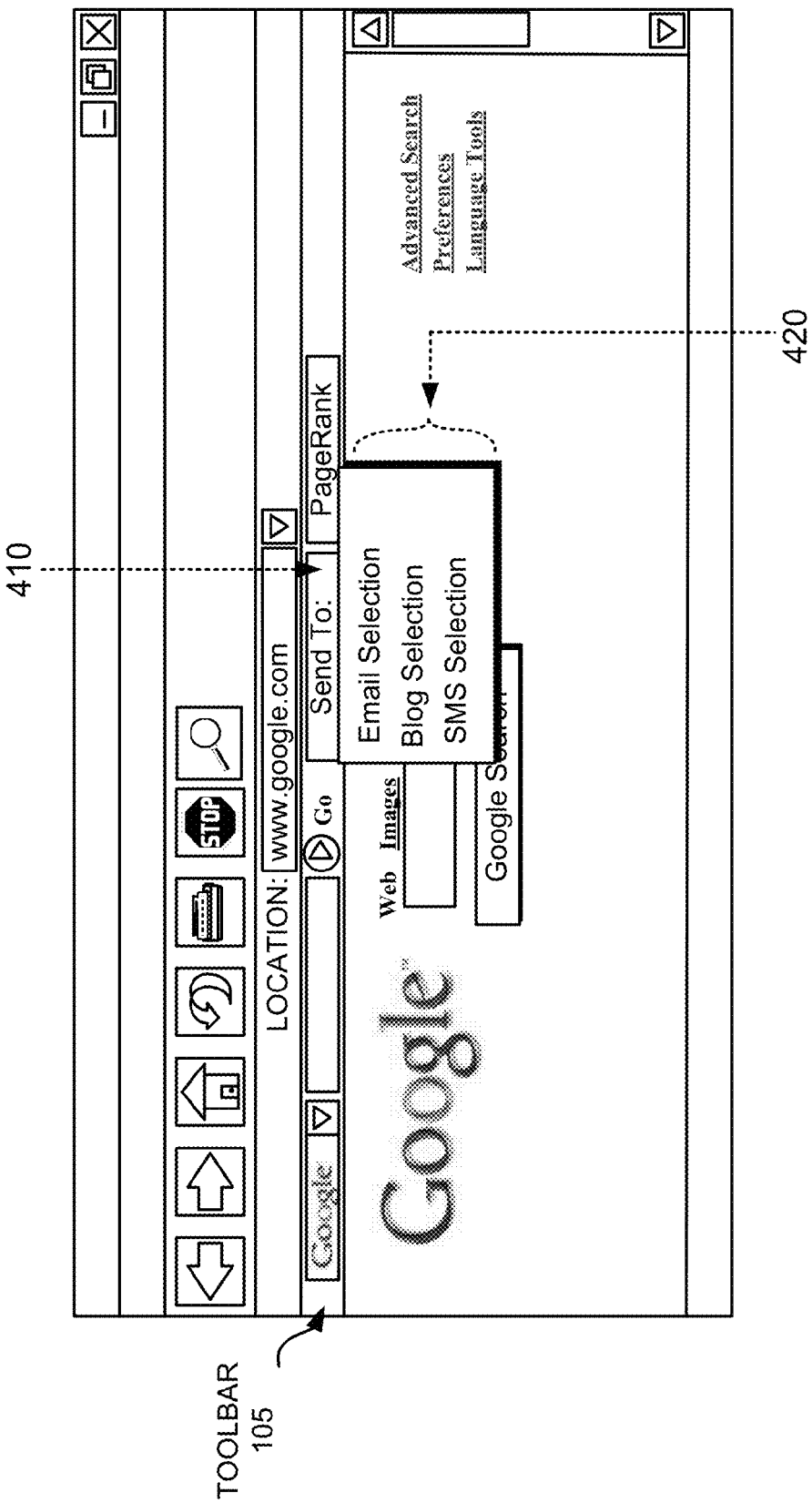

FIGS. 4A and 4B are diagrams that depict an exemplary browser toolbar 105 at a client 205. Among other features, toolbar 105 may include a "Send To: " button 410, the selection of which by a user at client 205 may produce a window 420 (e.g., a drop-down window). Window 420 may include a menu of multiple different services (e.g., in list form) that may be used for sharing document content with other users. In the exemplary implementation of FIG. 4A, window 420 may include the options of emailing, blogging, or short message servicing a current document (e.g., web page) being browsed. For example, if no content is currently selected in the browser (e.g., the user has not highlighted any portions of the currently displayed document), and the user selects button 410, then the user may choose from "Email this page," "Blog this Page," or "SMS this Page" from window 420. After selection of one of these services from window 420, the entire document (e.g., web page) currently being displayed in the browser may be posted into the selected email, blog or SMS service.

In the exemplary implementation of FIG. 4B, window 420 may include the options of emailing, blogging, or short message service servicing selected portions of a current document (e.g., web page) being browsed (e.g., the user has highlighted one or more portions of the currently displayed document). For example, if a user selects one or more sections of a document and then selects button 410, then the user may choose from "Email Selection," Blog Selection," or "SMS Selection" from window 420. After selection of one of these services from window 420, the selected sections of the document may be posted into the selected email, blog or SMS service.

EXEMPLARY TOOLBAR DOCUMENT CONTENT SHARING PROCESS

Figure 5A:
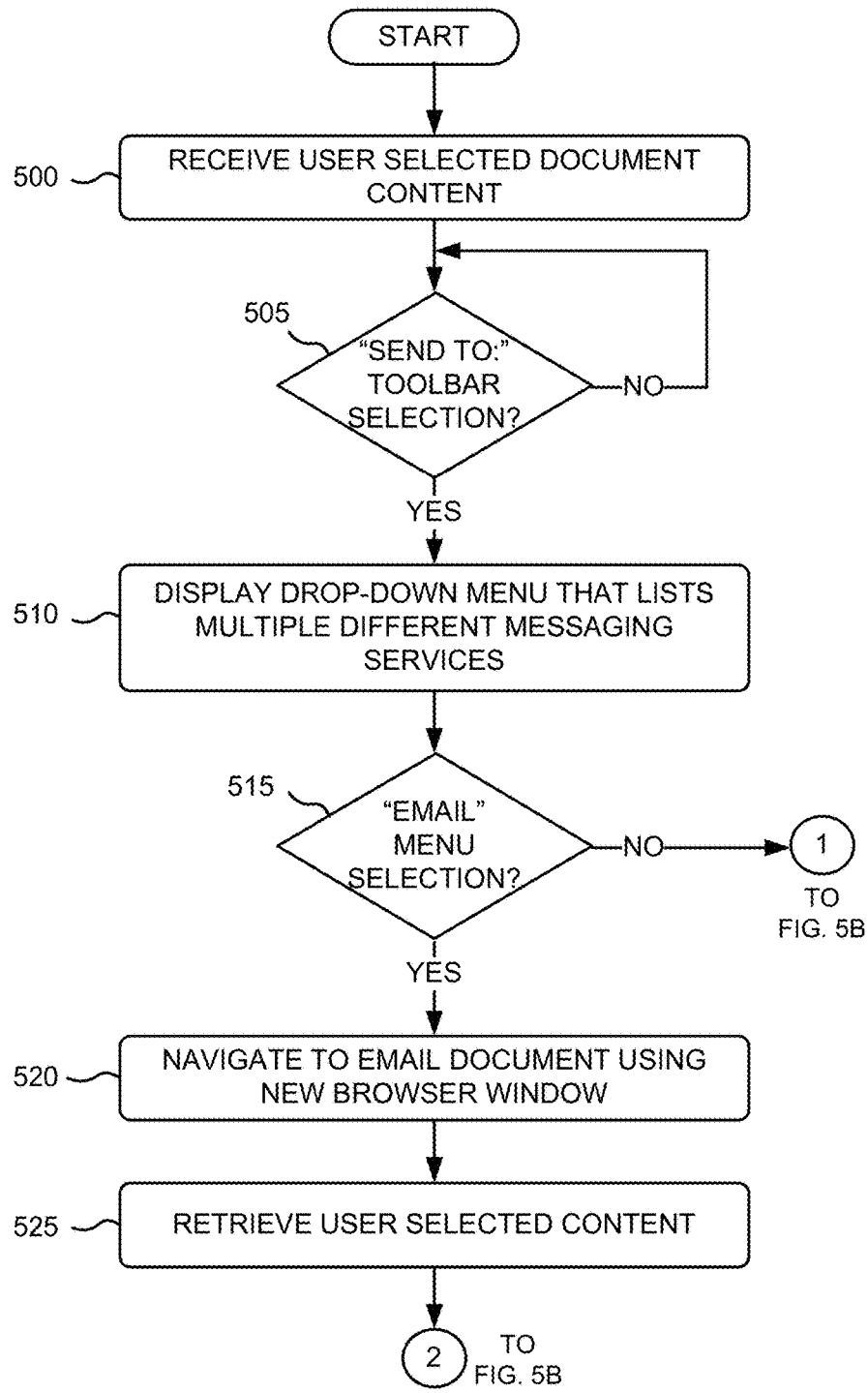
FIGS. 5A through 5C are a flowchart of an exemplary process for sharing document content via one of multiple services consistent with principles of the invention.
Figure 5B:
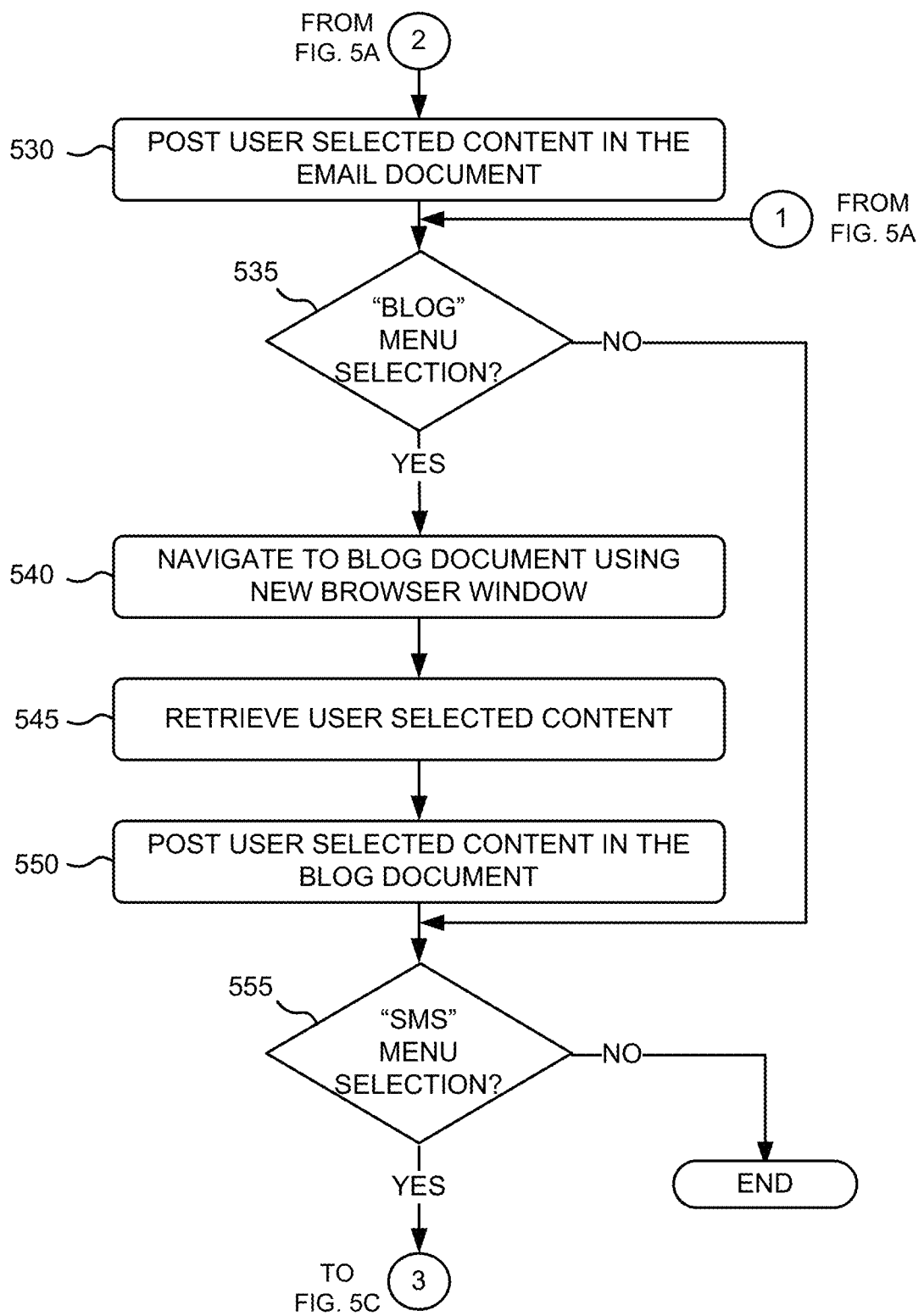
Figure 5C:
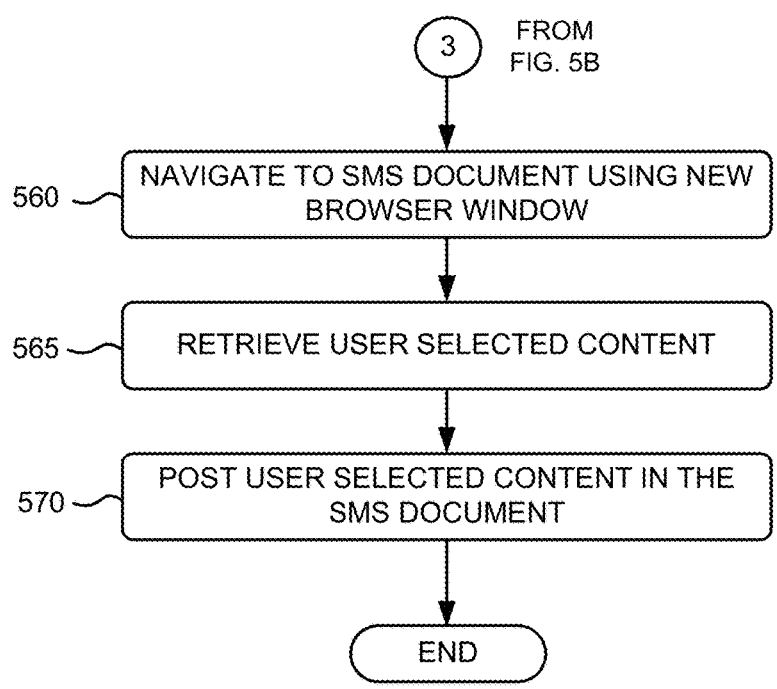

FIGS. 5A-5C are a flowchart of an exemplary process for sharing document content via one of multiple services consistent with principles of the invention. The process exemplified by FIGS. 5A-5C may be performed by toolbar 105 at a client 205.

Figure 6A:
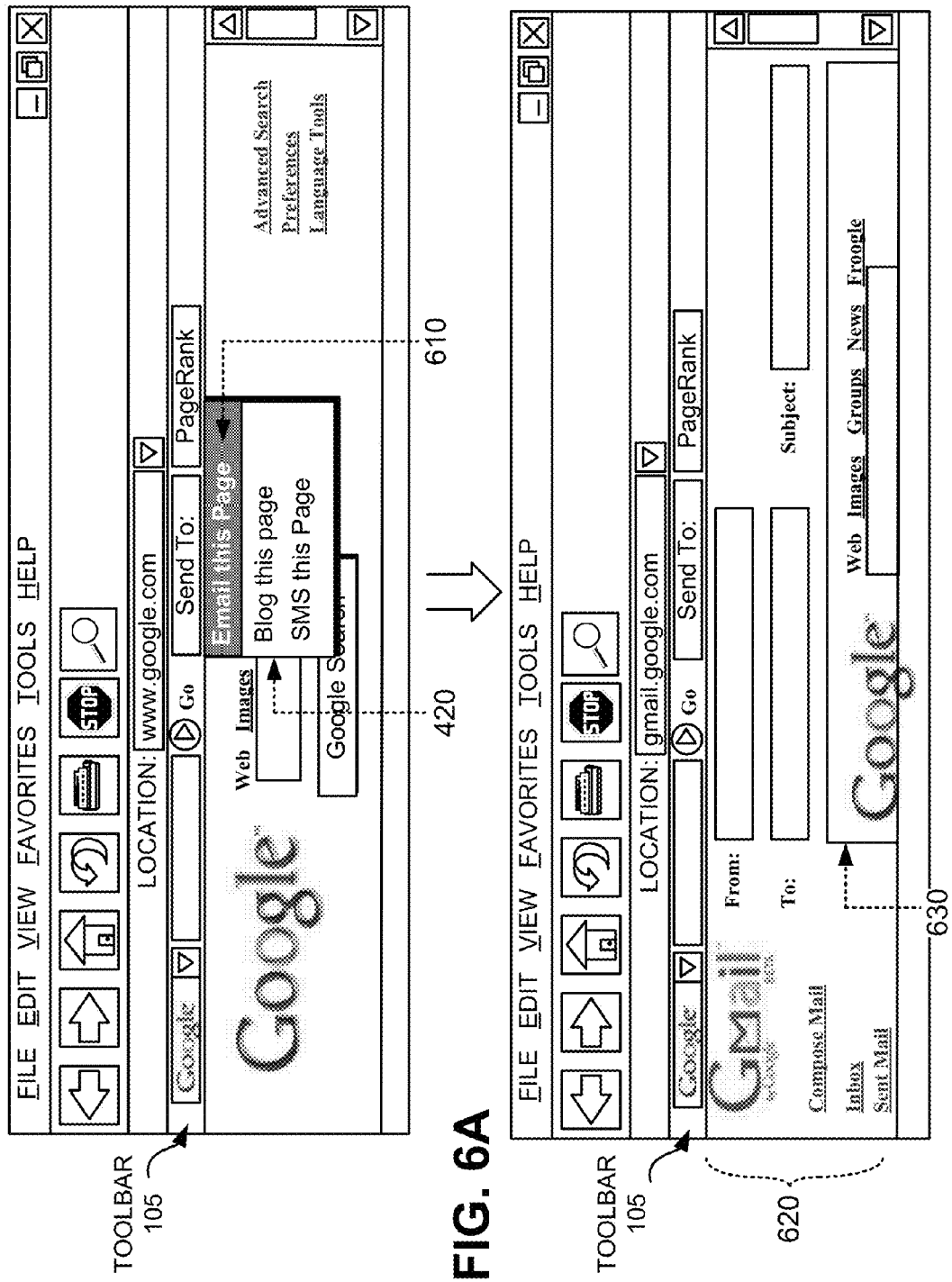
FIGS. 6A and 6B are diagrams of the selection of an e-mail service from multiple services provided on a browser toolbar for sharing document content with other users.
Figure 6B:
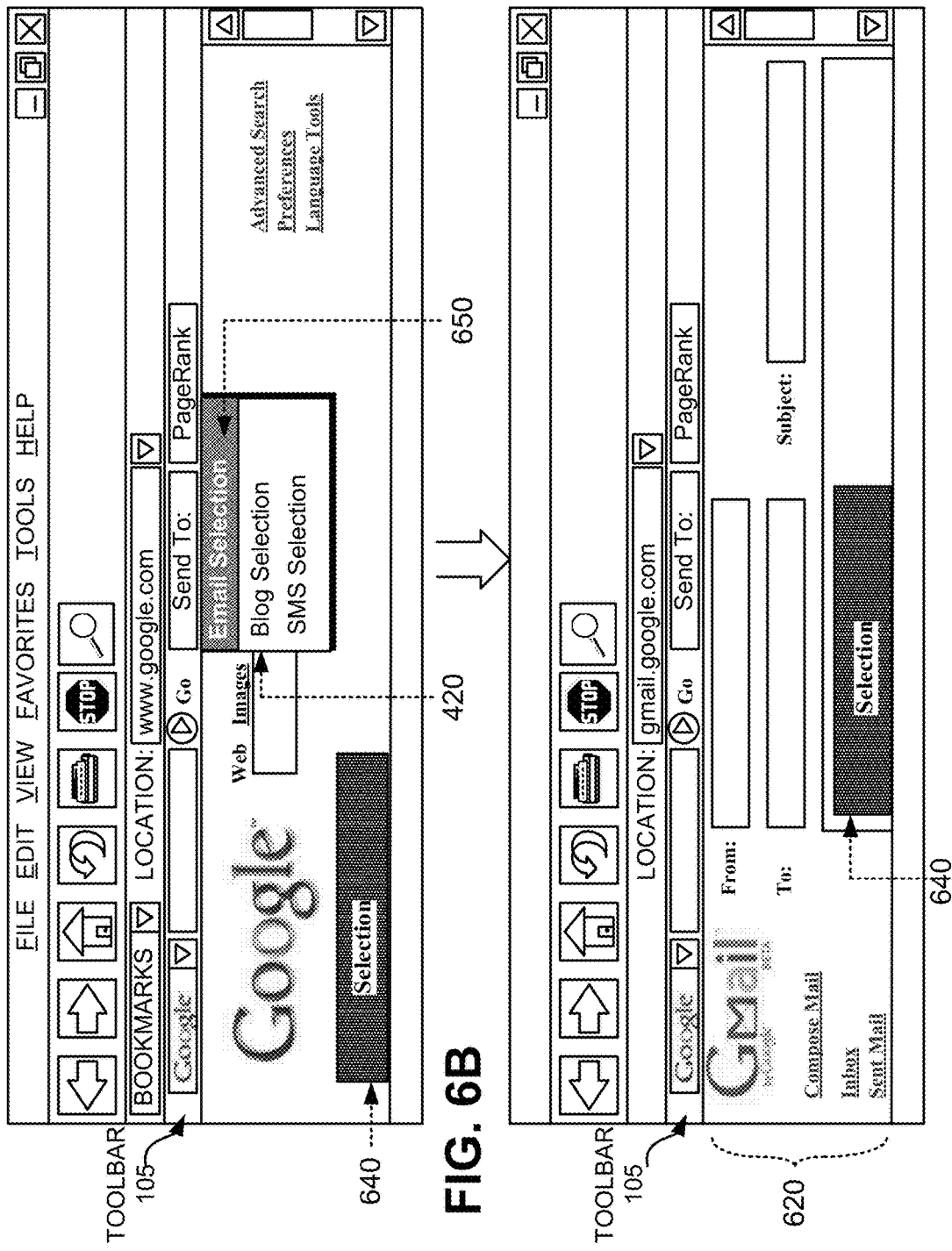

The exemplary process may begin with the receipt of a selected portion of a document's content (block 500). The user may select document content by browsing a specific document such that the document's content is displayed by a browser (i.e., effectively "selecting" the entirety of the document), or by selecting one or more portions of the document content displayed by the browser (e.g., by highlighting specific portions of the document using a mouse). A determination may be made whether "Send To:" button 410 has been selected by a user from toolbar 105 (block 505). A user may select button 410 on toolbar 105, for example, by "clicking" on the button using a mouse. If button 410 has been selected, then a drop-down menu 420 may be displayed in the browser that lists multiple different messaging services (block 510). For example, as shown in FIGS. 6A and 6B, window 420, containing a drop-down menu, may be displayed in toolbar 105.

A determination may be made whether the "email" messaging service has been selected from menu 420 (block 515). For example, as shown in FIGS. 6A and 6B, "Email this Page" 610 or "Email Selection" 650 may be selected from window 420. If "email" messaging has not been selected, the exemplary process may continue at block 530 below. If the "email" messaging service has been selected from menu 420, then toolbar may navigate to an email document using a new browser window (block 520). For example, as shown in FIGS. 6A and 6B, toolbar 105 may navigate to an email document 620 in a new browser window. Prior to navigating to email document 620, the user may, in some implementations consistent with the principles of the invention, first be required to log-in to the e-mail service. In such an instance, another intermediate browser window may be opened, and the user selected content may be temporarily posted in this browser until the user logs into the email service (e.g., provides a log-in identifier and password). After the user logs in, the user selected content may be retrieved from the browser and posted in the email document provided by email server 250.

Toolbar 105 may retrieve the user selected content (i.e., from block 500 above) and post the user selected content in the email document (blocks 525 and 530). For example, as illustrated in FIG. 6A, toolbar 105 may post an entire document 630 being browsed by the user in email document 620. As further shown in FIG. 6B, toolbar 105 may post a selection (e.g., a selected portion) 640 of a document into email document 620. The user may enter the remaining fields (e.g., "From:", "To:", "Subject:", etc.) of email document 620 prior to having email server 240 (e.g., Google Gmail) that hosts email document 620 forward the email to its intended destination.

Figure 7A:
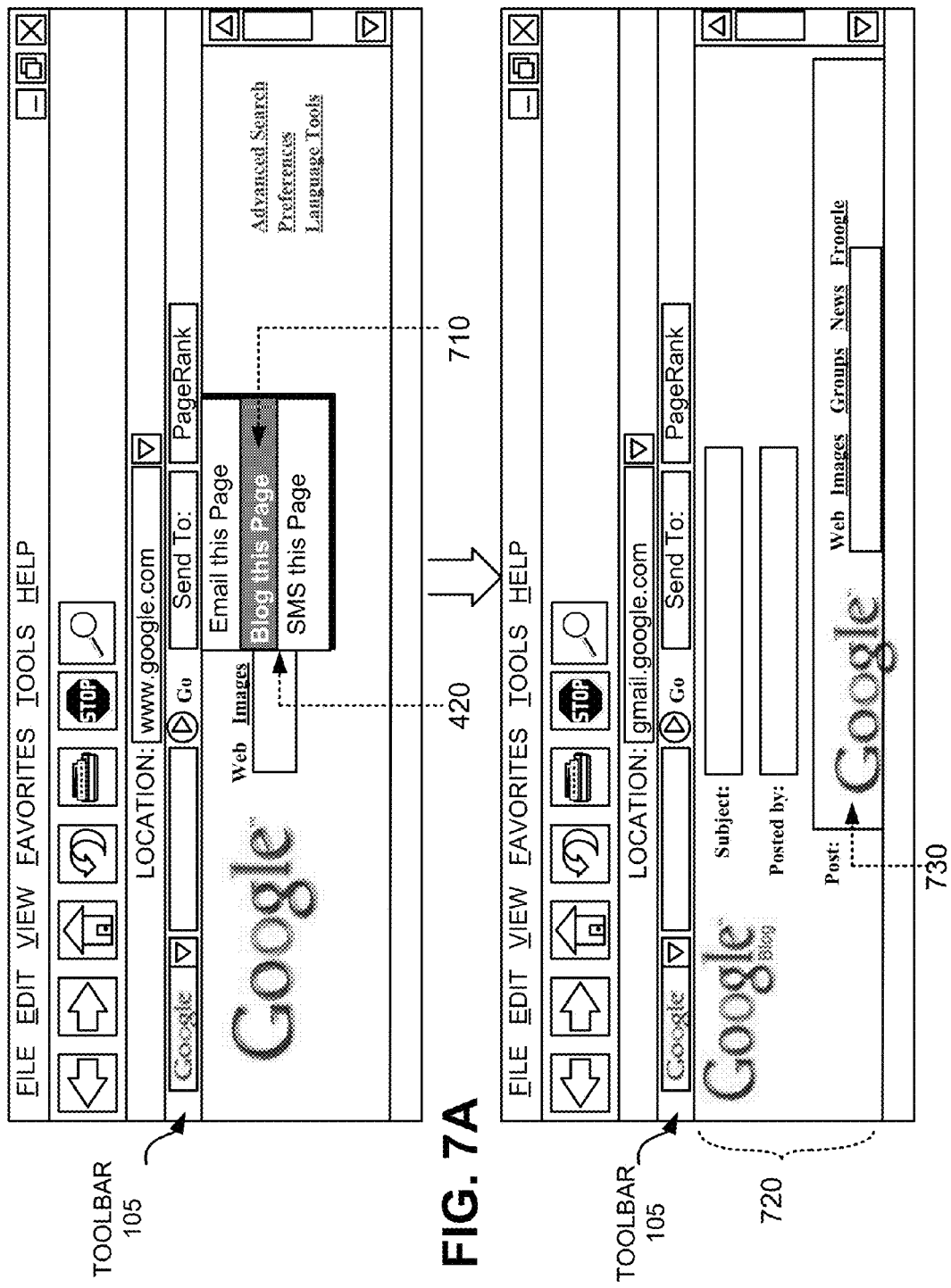
FIGS. 7A and 7B are diagrams of the selection of a blog service from multiple services provided on a browser toolbar for sharing document content with other users.
Figure 7B:
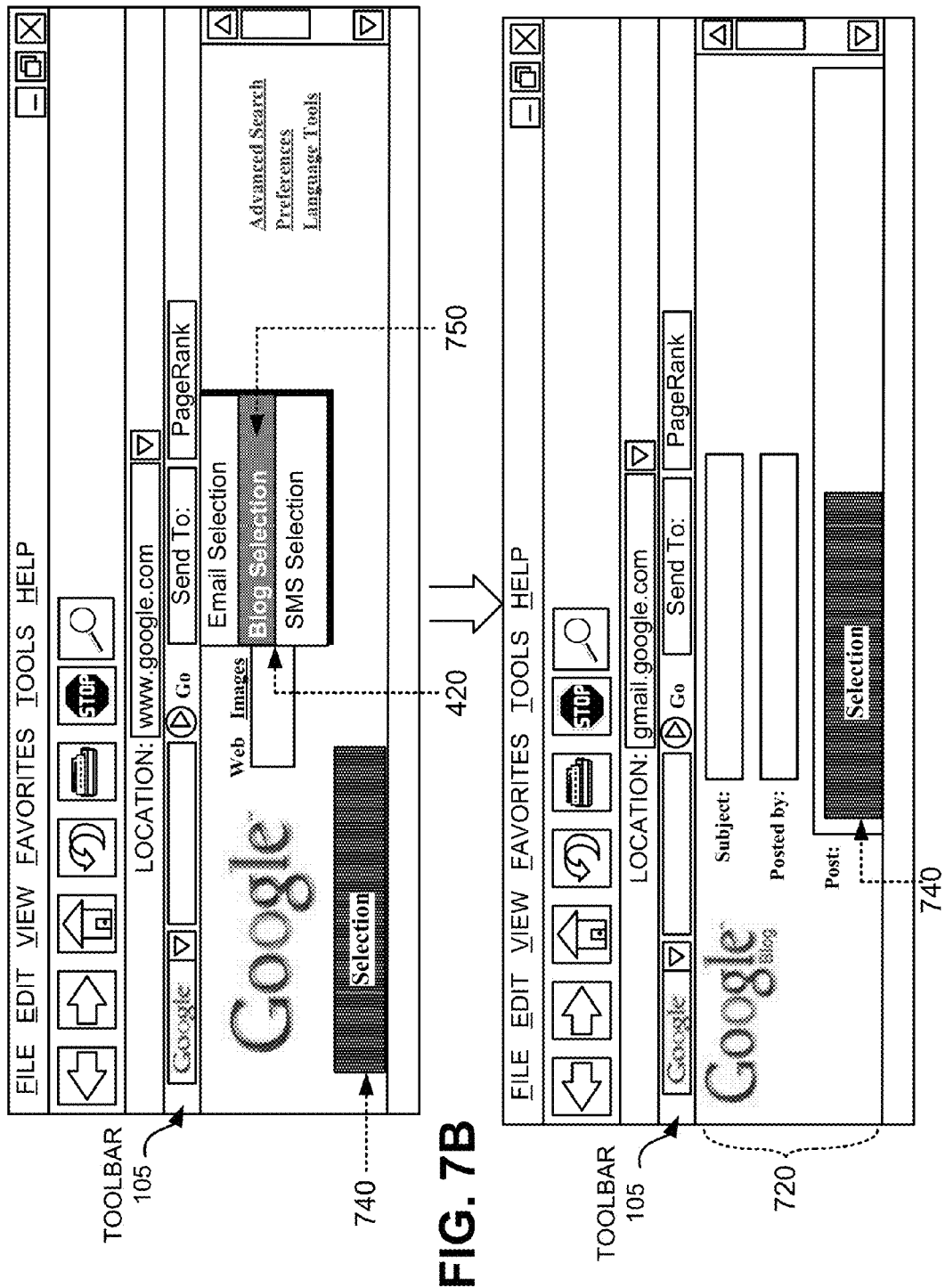

A determination may be made whether the "blog" messaging service has been selected from menu 420 (block 535, FIG. 5B). For example, as shown in FIGS. 7A and 7B, "Blog this Page" 710 or "Blog Selection" 750 may be selected from window 420. If "blog" messaging has not been selected, the exemplary process may continue at block 555 below. If the "blog" messaging service has been selected from menu 420, then toolbar 105 may navigate to a blog document using a new browser window (block 540). For example, as shown in FIGS. 7A and 7B, toolbar 105 may navigate to a blog document 720 in a new browser window. Prior to navigating to blog document 720, the user may, in some implementations consistent with the principles of the invention, first be required to log-in to the blog service. In such an instance, another intermediate browser window may be opened, and the user selected content may be temporarily posted in this browser until the user logs into the blog service (e.g., provides log-in identifier and password). After the user logs in, the user selected content may be retrieved from the browser and posted in the blog document provided by blog server 260.

Toolbar 105 may retrieve the user selected content (i.e., selected in block 500 above) (block 545) and may post the user selected content in the blog document (block 550). For example, as illustrated in FIG. 7A, toolbar 105 may post an entire document 730 being browsed by the user in blog document 720. As further shown in FIG. 7B, toolbar 105 may post a selection (e.g., a selected portion) 740 of a document into blog document 720. The user may enter the remaining fields (e.g., "Subject:", "Posted by:", etc.) of blog document 720 prior to having blog server 250 (e.g., Google Blog) that hosts blog document 720 post the blog for access by other users.

Figure 8B:
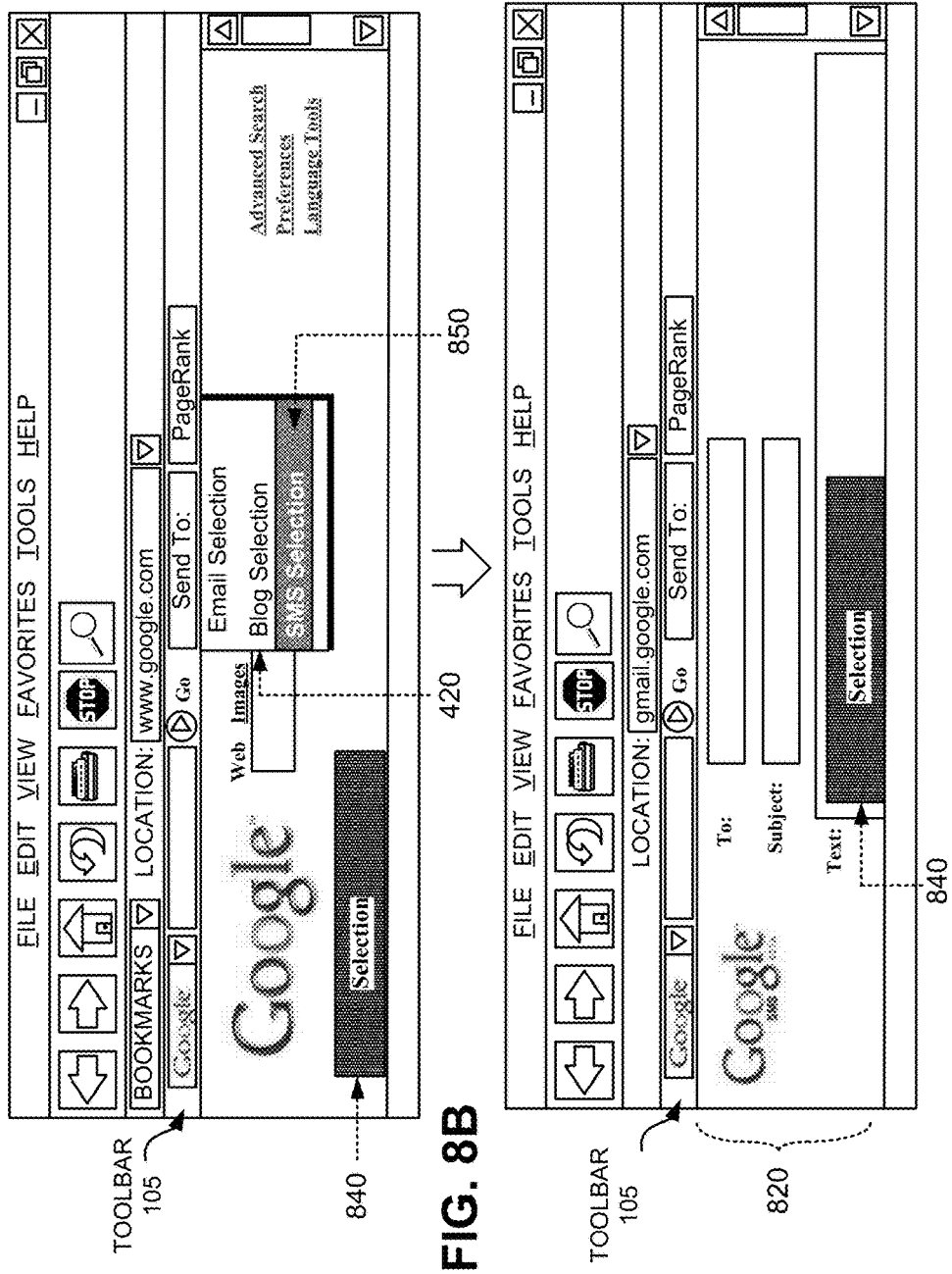

A determination may be made whether the "SMS" messaging service has been selected from menu 420 (block 555). For example, as shown in FIGS. 8A and 8B, "SMS this Page" 810 or "SMS Selection" 850 may be selected from window 420. If "SMS" messaging has been selected, toolbar 105 may navigate to a SMS document using a new browser window (block 560, FIG. 5C). For example, as shown in FIGS. 8A and 8B, toolbar 105 may navigate to a SMS document 820 in a new browser window. Prior to navigating to SMS document 820, the user may, in some implementations consistent with the principles of the invention, first be required to log-in to the SMS service. In such an instance, another intermediate browser window may be opened, and the user selected content may be temporarily posted in this browser until the user logs into the SMS service (e.g, provides a log-in identifier and password). After the user logs in, the user selected content may be retrieved from the browser and posted in the SMS document provided by SMS server 260.

Toolbar 105 may retrieve the user selected content (i.e., selected in block 500 above) and may post the user selected content in the SMS document (blocks 565 and 570). For example, as illustrated in FIG. 8A, toolbar 105 may post an entire document 830 being browsed by the user in SMS document 820. As further shown in FIG. 8B, toolbar 105 may post a selection (e.g., a selected portion) 840 of a document into SMS document 820. The user may enter the remaining fields (e.g., "To:", "Subject:", etc.) of SMS document 820 prior to having SMS server 260 (e.g., Google SMS) that hosts SMS document 820 forward the message to its intended destination (e.g., to an intended cellular telephone).

The user selected content posted in the email document (e.g., block 530), the blog document (e.g., block 550) and/or the SMS document (e.g., block 570) may subsequently be forwarded by a respective service to its intended destination. For example, an email service that corresponds to the email document (e.g., Google Gmail) may forward an email containing the user selected content to a user specified destination email address. As another example, a blog service that corresponds to the blog document may post the user selected content, and any associated text added by the user, in a blog post that may be accessed by multiple other users. As a further example, a SMS service that corresponds to the SMS document may forward a SMS message that includes the user selected content to a user-specified destination (e.g., a destination cellular telephone).

Figure 9:
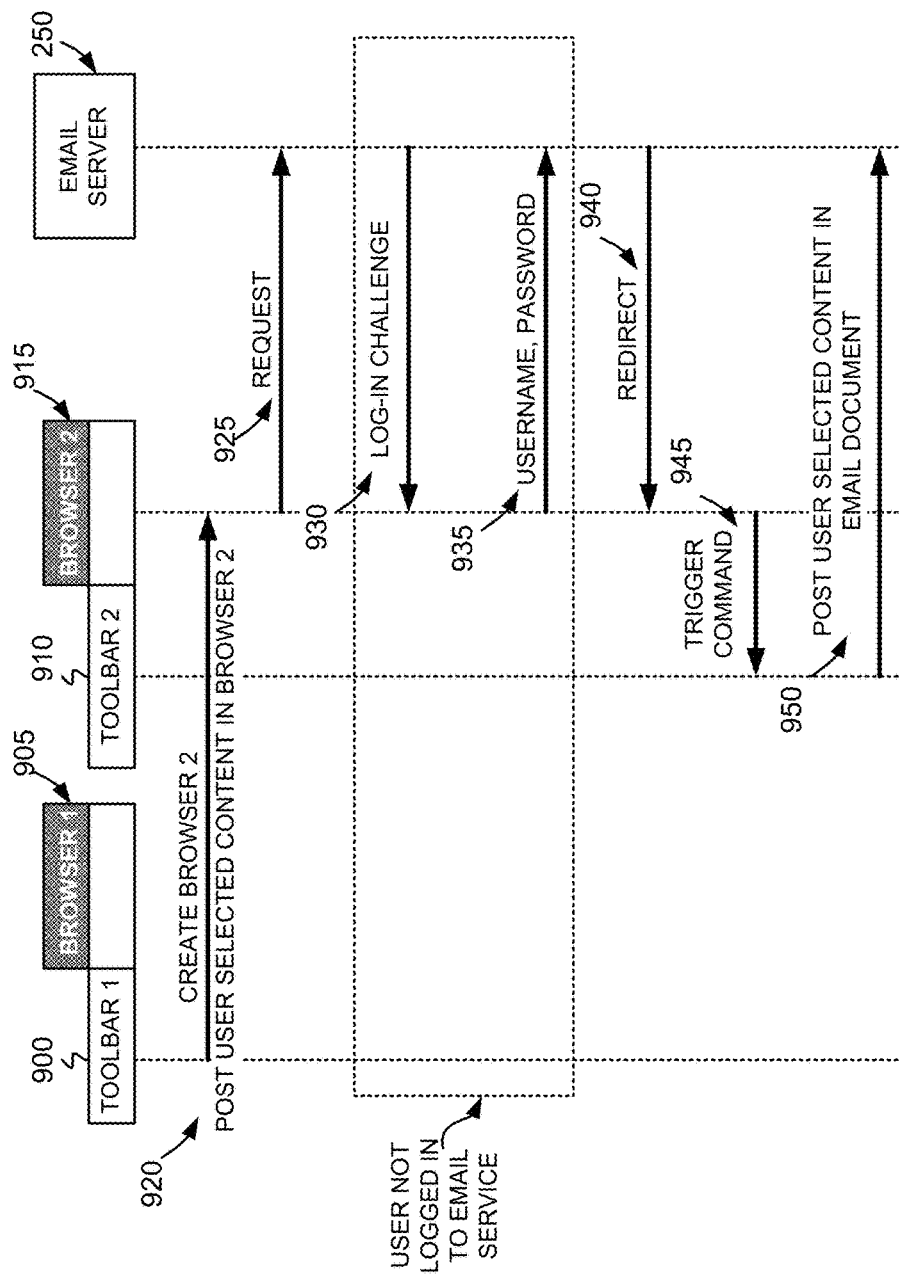
FIG. 9 is a diagram that illustrates toolbar, browser and server interaction consistent with one exemplary implementation of the invention.

FIG. 9 graphically illustrates toolbar, browser and email server interaction, consistent with one exemplary implementation, for automatic posting of user selected content in an email document for sharing with one or more other users. As shown in FIG. 9, a user may select content via browser 1 905, and then may select an email service for sharing content via toolbar 1 900. In response to the user selection, toolbar 1900 may create (see 920) a second browser (browser 2 915), having its own toolbar (toolbar 2 910), and may post the user selected content in browser 2 915. After posting of the user selected content, browser 2 915 may send a request (see 925) to email server 250 requesting that server 250 provide an email document into which the user selected content can further be posted. If the user has not yet logged into email server 250, email server 250 may send (see 930) a log-in challenge to browser 2 915. The user, via browser 2 915, may provide (see 935) a log-in username and password to email server 250. In response to the user log-in, email server 250 may send (see 940) a redirect message to browser 2 915 causing browser 2 915 to navigate to an email document hosted by email server 250. In response to the redirect message, browser 2 915 may send (see 945) a trigger command to toolbar 2 910. Toolbar 2 910, in response to receipt of the trigger command, may post the user selected content in the email document provided by email server 250. The user may subsequently enter email address information and send the email to share the user selected content.

The toolbar, browser and email server interaction described above with respect to FIG. 9 may similarly be applied to blog server 250, or SMS server 260.

CONCLUSION

The foregoing description of implementations consistent with principles of the invention provides illustration and description, but is not intended to be exhaustive or to limit the invention to the precise form disclosed. Modifications and variations are possible in light of the above teachings, or may be acquired from practice of the invention. For example, while series of acts have been described with regard to FIGS. 5A-5C, the order of the acts may be modified in other implementations consistent with the principles of the invention. Further, non-dependent acts may be performed in parallel. While some aspects of the invention have been described as being implemented using a toolbar menu, in other implementations, a content delivery service may be selected using a context menu (e.g., a right-click menu). In further implementations, keyboard accelerators (e.g., shortcut keys) may be used to initiate the content sharing process.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
presenting, by a device, a document for display in a first browser window of a browser, the document including content;
receiving, by the device, selection of a portion of the content included in the document, the portion of the content being less than an entirety of the content included in the document;
providing, by the device, a selectable option in the browser for sharing the portion of the content after receiving the selection of the portion of the content, the option including an option to share the portion of the content via e-mail;
receiving, by the device, selection of the option to share the portion of the content via email;
opening, by the device, a second browser window, of the browser, based on receiving the selection of the option to share the portion of the content via e-mail, the second browser window being different from the first browser window;
creating, by the device and after opening the second browser window, an e-mail that includes the portion of the content for display within the second browser window of the browser; and
posting, by the device and after creating the e-mail, the portion of the content in the email, within the second browser window of the browser, to permit the portion of the content to be shared with one or more users via the e-mail.

2. The method of claim 1, where providing the option for sharing the portion of the content includes:
providing the option for sharing the portion of the content via a right-click menu of the browser.

3. The method of claim 1, where the browser is a web browser, and
where the document is a web page.

4. The method of claim 1, where the option for sharing the portion of the content further includes:
an option to share the portion of the content via a blog.

5. The method of claim 4, further comprising:
receiving selection of the option to share the portion of the content via the blog;
opening a third browser window, of the browser, based on receiving the selection of the option to share the portion of the content via the blog, the third browser window being different from the first browser window; and
posting the portion of the content in a blog document, within the third browser window, to permit the portion of the content to be shared with at least one user via the blog.

6. The method of claim 1, where the option for sharing the portion of the content further includes:
an option to share the portion of the content via instant messaging.

7. The method of claim 6, further comprising:
receiving selection of the option to share the portion of the content via instant messaging;
opening a third browser window, of the browser, based on receiving the selection of the option to share the portion of the content via instant messaging, the third browser window being different from the first browser window; and
posting the portion of the content in a document, within the third browser window, to permit the portion of the content to be shared with at least one user via instant messaging.

8. A system comprising:
a device to:
present a document for display in a first browser window of a browser;
receive selection of content included in the document;
provide a selectable option in the browser for sharing the content after receiving the selection of the content, the option for sharing the content including an option to share the content via e-mail;
receive selection of the option to share the content via e-mail;
open a second browser window, of the browser, based on receiving the selection of the option to share the content via e-mail,
the second browser window being different from the first browser window;
create, after opening the second browser window, an e-mail that includes the portion of the content for display within the second browser window; and
post, after creating the e-mail, information regarding an entirety of the content or information regarding a portion of the content in the e-mail, within the second browser window of the browser, to permit the entirety of the content or the portion of the content to be shared with one or more users via the e-mail,
the portion of the content being less than the entirety of the content,
the information regarding the entirety of the content being posted to the email when the selection of the content relates to selection of the entirety of the content,
the information regarding the portion of the content being posted to the email when the selection of the content relates to selection of the portion of the content.

9. The system of claim 8, where, when providing the option for sharing the content, the device is to:
provide the option for sharing the content via a tool bar of the browser.

10. The system of claim 8, where the entirety of the content or the portion of the content is selected by a user, and
where, when posting the information regarding the entirety of the content or the information regarding the portion of the content, the device is to:
determine that the user has logged in to an e-mail service associated with the email; and
post the information regarding the entirety of the content or the information regarding the portion of the content after determining that the user has logged in to the email service.

11. The system of claim 8, where, when providing the option for sharing the content, the device is to:
provide the option for sharing the content via a right-click menu of the browser.

12. The system of claim 8, where the browser is a web browser, and where the document is a web page.

13. The system of claim 8, where the option for sharing the content further includes an option to share the content via a blog, and
where the device is further to:
receive selection of the option to share the content via the blog;

open a third browser window, of the browser, based on receiving the selection of the option to share the content via the blog,
the third browser window being different from the first browser window; and
post the information regarding the entirety of the content or the information regarding the portion of the content in a blog document, within the third browser window, to permit the information regarding the entirety of the content or the information regarding the portion of the content to be shared with at least one user via the blog.

14. The system of claim 8, where the option for sharing the content further includes an option to share the content via instant messaging, and
where the device is further to:
receive selection of the option to share the content via instant messaging;
open a third browser window, of the browser, based on receiving the selection of the option to share the content via instant messaging, the third browser window being different from the first browser window; and
post the information regarding the entirety of the content or the information regarding the portion of the content in a document, within the third browser window, to permit the information regarding the entirety of the content or the information regarding the portion of the content to be shared with at least one user via instant messaging.

15. A non-transitory computer-readable medium that stores instructions, the instructions comprising:
one or more instructions which, when executed by one or more processors, cause the one or more processors to present a document for display in a first browser window of a browser;
one or more instructions which, when executed by the one or more processors, cause the one or more processors to receive selection of content included in the document;
one or more instructions which, when executed by the one or more processors, cause the one or more processors to provide a selectable option in the browser for sharing content after receiving the selection of the content, the option for sharing content including an option to share content via e-mail;
one or more instructions which, when executed by the one or more processors, cause the one or more processors to receive selection of the option to share content via e-mail;
one or more instructions which, when executed by the one or more processors, cause the one or more processors to open a second browser window, of the browser, based on receiving the selection of the option to share content via e-mail, the second browser window being different from the first browser window;
one or more instructions which, when executed by the one or more processors, cause the one or more processors to create, after opening the second browser window, an e-mail that includes the portion of the content for display within the second browser window of the browser; and
one or more instructions which, when executed by the one or more processors, cause the one or more processors to post, after creating the e-mail and in the e-mail within the second browser window of the browser, information regarding an entirety of the content included in the document or information regarding a portion of the content included in the document to permit the entirety of the content or the portion of the content to be shared with one or more users via the e-mail,
the portion of the content being less than the entirety of the content,
the information regarding the entirety of the content being posted to the e-mail when the selection of the content relates to selection of the entirety of the content,
the information regarding the portion of the content being posted to the e-mail when the selection of the content relates to selection of the portion of the content.

16. The non-transitory computer-readable medium of claim 15, where the instructions further comprise:
one or more instructions to present another document for display in the first browser window;
one or more instructions to receive selection of the option to share content via e-mail without receiving selection of content included in the other document; and
one or more instructions to post an entirety of the content, included in the other document, in another e-mail document within a third browser window of the browser, based on receiving the selection of the option to share content via e-mail without receiving the selection of the content included in the other document,
the other e-mail document being included in the third browser window of the browser.

17. The non-transitory computer-readable medium of claim 15, where the document is a web page.

18. The non-transitory computer-readable medium of claim 15, where the one or more instructions to provide the option for sharing content include:
one or more instructions to provide the option for sharing content via:
a right-click menu associated with the browser, or
a toolbar associated with the browser.

19. The non-transitory computer-readable medium of claim 15, where the option for sharing content further includes at least one of:
an option for sharing content via a blog, or
an option for sharing content via instant messaging.

20. The non-transitory computer-readable medium of claim 19, where the instructions further comprise:
one or more instructions to post the information regarding the entirety of the content or the information regarding the portion of the content, within a third browser window of the browser, to permit the information regarding the entirety of the content or the information regarding the portion of the content to be shared with at least one user via the blog when the option for sharing content via the blog is selected; and
one or more instructions to post the information regarding the entirety of the content or the information regarding the portion of the content, within a fourth browser window, to permit the information regarding the entirety of the content or the information regarding the portion of the content to be shared with at least one user via instant messaging when the option for sharing content via instant messaging is selected.

* * * * *